UNITED STATES PATENT OFFICE.

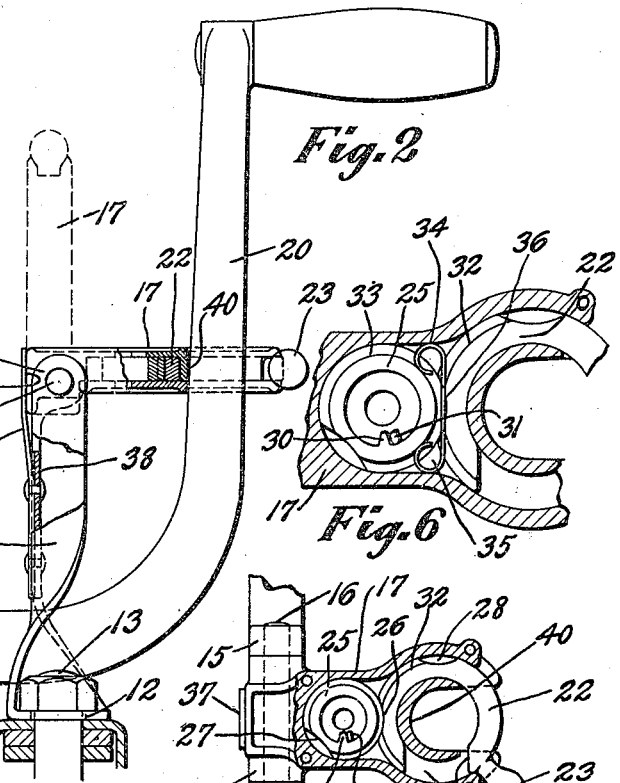

JOHN T. CORLEY, OF PROVIDENCE, RHODE ISLAND.

LOCKING DEVICE.

1,150,999.  Specification of Letters Patent.  Patented Aug. 24, 1915.

Application filed January 10, 1914. Serial No. 811,461.

*To all whom it may concern:*

Be it known that I, JOHN T. CORLEY, a citizen of the United States, and resident of the city of Providence, in the county of Providence and State of Rhode Island, have invented certain new and useful Improvements in Locking Devices, of which the following is a specification.

This invention relates to locking devices for retaining relatively movable parts of a vehicle, and has for its object to provide such a device which is more particularly adapted for retaining and locking the starting crank handle of automobiles or the like, the same comprising a yoke arm adjustably connected to a relatively fixed portion of the vehicle and adapted to be moved to either embrace or release said member as desired.

The invention further consists in providing means in said device whereby said arm may be securely locked to the member to be secured.

A further object of the invention is to provide an adjustable yoke finger in said arm adapted to be moved to further embrace the member to be locked and to provide means in said arm whereby said finger may be securely locked in engaged position.

The invention further consists in providing means whereby the yoke arm may be releasably retained in either engaging or disengaging position.

A further object of the invention is to provide a bendable bracket in which the yoke arm is mounted, said bracket being of thin material adapted to be bent slightly so as to cause the yoke arm to yieldingly engage the crank to prevent the parts from rattling.

With these and other objects in view, the invention consists of certain novel features of construction, as will be more fully described and particularly pointed out in the appended claims.

Of the accompanying drawings: Figure 1— is a front view showing a portion of an automobile with the crank locked in position by my improved locking device. Fig. 2— is a side elevation of my improved locking device showing the yoke arm as engaging the starting crank handle. Fig. 3— is a front view showing the shape of the bracket with the yoke arm mounted therein. Fig. 4— is a plan view of the yoke arm with the top removed and showing the yoke finger in release position. Fig. 5— is the same as Fig. 4 but showing the yoke finger in engaging position. Fig. 6— is a slightly enlarged view illustrating the position and action of a retaining spring which prevents the locking parts from rattling. Fig. 7— is a plan view showing a modified form of yoke arm. Fig. 8— is a view of the locking key.

Referring to the drawing, 10 designates my improved bracket having a body portion constructed of very thin material the same being trough-shape in cross section with forwardly extending ribs 11—11 on either edge thereof. The lower end of the bracket is provided with wide spreading feet 12 which are adapted to be secured by means of bolts 13 to the frame 14 of the automobile, as illustrated in Fig. 1. The upper end of the bracket is forked and provided with a pair of ears 15 drilled to receive a pintle 16 on which a yoke arm 17 is pivotally mounted. This yoke arm consists of a body having a hub 18 at its inner end drilled to receive the pintle 16 which passes therethrough and through the ears 15 in the bracket to pivotally connect the arm thereto. The outer portion of the arm is cut away forming an opening thereinto at 19, see Fig. 4, for the reception of the starting crank arm 20. The outer end of this arm is somewhat enlarged and is provided with a circular groove 21 formed in its face in which is rotatably mounted a correspondingly shaped yoke finger 22. This finger has an opening into it at 24 corresponding to and adapted to register with the opening 19 in the arm. A handle 23 projects outward from one end of the finger which when moved to the position illustrated in Fig. 4 causes the opening in both the finger and arm to register thereby permitting the crank handle to freely enter. Then when the fingers are moved to the position shown in Fig. 5 the opening is closed and the arm is secured to the crank handle.

In order to provide locking means for securely fastening this yoke finger in its closed position I have formed an annular ring 25 which sets into the body of the arm and a portion of whose outer periphery when formed on a true circle, is adapted to extend beyond the outer periphery of the yoke and enter a notch 26 therein. This ring is also provided with a notch 27, see Fig. 5, which when facing the yoke permits the free rotation of the latter, but when the locking ring is rotated to bring its notch to one side of the finger then the circular periphery of the lock ring enters the notch 26 in the finger and secures the same firmly against rotation in closed position. A second notch 28 is also formed in the periphery of the finger whereby it may also be locked in open position when desired, as illustrated in Fig. 4. In order to manipulate this locking ring a key 29, see Fig. 8, is provided which may enter the center of the ring through a key-hole in the casing of the arm and engage the inwardly extending boss 30 and rotate the same until it brings up against the stop pin 31 when it is in locked position, and then by rotating the same in the reverse direction until the lock brings up against the other side of the stop pin, the notch is in line with the periphery of the fingers and the latter is then released and free to be moved.

Where devices of this character are employed in automobiles and the like, it is essential to provide means for preventing rattling of the parts, therefore to obviate this difficulty I have formed an annular groove at 32 in the edge of the yoke arm 22 and another corresponding groove at 33 in the edge of the lock ring 25 and have provided a spring 34 having coils 35 at its opposite ends. This spring is inserted transversely of the arm with its middle portion 36 bearing against the edge in the yoke arm 22 and its coil ends bearing against the edge 33 in the lock ring 25, thereby applying a tension to holding these parts in their respective recesses against rattling.

A feature of the invention is the provision of a flat spring 37 which is riveted to the back 38 of the bracket to extend up to engage and press against the flattened rest end 39 of the arm 17 whereby its pressure releasably holds the arm in horizontal position and also permits the arm to be turned up into position illustrated in dotted lines in Fig. 2 or down to lay between the ribs 11—11 of the bracket as illustrated in Fig. 3. Another feature of the invention is that the bracket is formed of thin material and adapted to be bent even after it is firmly bolted in position, so as to bring the bottom portion 40 of the yoke against the back side of the crank handle thereby holding the crank handle firmly in position under the spring pressure of the bracket to prevent the parts from rattling. In some instances where it is found unnecessary to use the yoke finger in the arm I have provided a plain yoke arm, as illustrated in Fig. 7, for engaging the crank handle, the same to be hung in the bracket and swing to the different positions like the locking arm 17.

In operating my improved device the bracket is rigidly bolted to the frame of the car being designed more especially to fit the frame bolts in a car of certain design. The yoke arm is then placed in a horizontal position to engage the crank handle and the bracket is bent either forward or back until the bottom of the opening presses against the crank handle with sufficient force to hold the same from rattling, the spring of the bracket serving to exert the necessary pressure for this purpose. When it is desired to operate the crank to start the motor it is only necessary to throw the arm either up or down out of the way when the crank is free to rotate. When it is desired to lock the handle the same is placed in upright position and the arm brought to a horizontal position so that its forked end straddles the lever and the yoke finger 22 is carried around the handle into the position illustrated in Fig. 5, the key is inserted to rotate the lock ring and the handle is thus securely locked in position to prevent the car from being started by unauthorized persons.

I do not wish to limit the use of my improved locking device to engaging the crank handle of an automobile as it may be secured to any part of the vehicle and engage any relatively movable lever or member which it may be adapted to embrace.

I claim:

1. A locking device comprising a yieldable bracket secured to the vehicle, a yoke pivoted to said bracket and adapted to be turned and yieldably held into engagement with the part to be locked whereby rattling is prevented, a locking finger rotatably mounted in said yoke and a locking ring rotatably mounted in said yoke and adapted to retain said finger in locked position.

2. In a locking device, a yieldable bracket secured to the vehicle, a yoke pivoted to said bracket and adapted to be turned and yieldably held in engagement with the part to be locked whereby rattling is prevented, and having a groove in its upper surface, a member rotatably mounted in said groove and adapted to be rotated to close the open end of said yoke and a locking ring rotatably mounted in said yoke and adapted to lock said member in closed position.

3. In a locking device, a bracket having feet secured to the vehicle, a yoke pivoted to said bracket and adapted to be turned in engagement with the part to be locked, said yoke having a groove in its upper face, a locking member rotatably mounted in said groove and adapted to be rotated to close the open end of said yoke and provided with a notch in its periphery, and a locking ring rotatably mounted in the upper face of said yoke and to engage the notch in said locking member to secure the same in locked position.

4. In a locking device, a bracket secured to the vehicle, a yoke pivoted to said bracket and adapted to be turned in engagement with the part to be locked, said yoke having a groove in its upper face, a locking member rotatably mounted in said groove and adapted to be rotated to close the open end of said yoke, a locking ring rotatably mounted in the upper face of said yoke and adapted to engage the notch in said locking member to secure the same in locked position, and a spring mounted in the upper face of said yoke and engaging said locking ring to prevent rattling thereof.

5. In a locking device, a bracket, a locking yoke pivoted to said bracket and adapted to be folded into locking position, said bracket being bendable whereby said locking yoke may be forced and retained in firm engagement with the part to be locked whereby rattling is prevented.

6. A locking device for automobile cranks comprising a bracket having supporting feet at one end and forked at the other end, an arm pivotally supported at one end by the forked end of the bracket and having spaced apart rigid yoke arms at the other end, said arm normally extending in vertical alinement with the bracket, forming a continuation thereof free to extend at right angles to said bracket with the yoke straddling a crank, and means carried by said bracket and engaging the pivoted end of the yoke to retain the latter in either of said positions.

7. A locking device having a yieldable member adapted to be connected at one end to the vehicle frame, said yieldable member being also provided with a crank engaging yoke adapted to engage and yieldably press against the crank to hold the same in position and prevent it from rattling.

In testimony whereof I affix my signature in presence of two witnesses.

JOHN T. CORLEY.

Witnesses:
HOWARD E. BARLOW,
E. I. OGDEN.

Copies of this patent may be obtained for five cents each, by addressing the "Commissioner of Patents, Washington, D. C."